United States Patent
Cristofori et al.

(10) Patent No.: US 7,026,942 B2
(45) Date of Patent: Apr. 11, 2006

(54) METHOD FOR SIGNALLING THE PRESENCE OF PREY IN TRAPS FOR VERMIN AND DEVICE FOR CARRYING OUT THIS METHOD

(76) Inventors: Gilberto Cristofori, Strada Maggiore, 17 I-40125 Bologna BO (IT); Ugo Glanchecchi, Via Cavalieri di Vittorio Veneto, 8 I-56021 Cascina BI (IT)

( * ) Notice: Subject to any disclaimer, the term of this patent is extended or adjusted under 35 U.S.C. 154(b) by 58 days.

(21) Appl. No.: 10/113,986

(22) Filed: Apr. 1, 2002

(65) Prior Publication Data

US 2002/0167409 A1 Nov. 14, 2002

Related U.S. Application Data

(63) Continuation-in-part of application No. 09/590,219, filed on Jun. 8, 2000, now abandoned.

(30) Foreign Application Priority Data

Jun. 8, 1999 (IT) .......................................... PI99A0032

(51) Int. Cl.
*G08B 23/00* (2006.01)

(52) U.S. Cl. .................. 340/573.2; 340/384.2; 43/61; 43/58; 43/81

(58) Field of Classification Search ................ 340/573, 340/384.2, 567, 573.2, 546, 545.6, 570, 689, 340/693.5; 43/60, 61, 69, 58, 81, 65, 74

See application file for complete search history.

(56) References Cited

U.S. PATENT DOCUMENTS

| 5,184,416 | A | * | 2/1993 | Brewer | 43/81 |
| 5,477,635 | A | * | 12/1995 | Orsano | 43/81 |
| 6,016,623 | A | * | 1/2000 | Celestine | 43/61 |
| 6,202,340 | B1 | * | 3/2001 | Nieves | 43/61 |
| 6,445,301 | B1 | * | 9/2002 | Farrell et al. | 340/573.2 |
| 6,481,151 | B1 | * | 11/2002 | Johnson et al. | 43/69 |

* cited by examiner

*Primary Examiner*—Daryl C. Pope
(74) *Attorney, Agent, or Firm*—Simpson & Simpson, PLLC

(57) ABSTRACT

A method and a device for automatically detecting and signaling the presence of prey caught in a trap. The trap has inlet ports equipped with a one-way inlet mechanism such that once a rodent has passed a central point the rodent is contained within the trap. After the rodent has passed the central point, the trap is reset to the start position in order to attract additional prey. The trap is provided with a device for signaling the presence of vermin in the trap. The mechanism may be operable via a push button operated by movement of the vermin. Alternatively, means for detecting the rodent may include the use of vertical or horizontally elongated elements that are actuated by the movement of the vermin. A further embodiment includes a photocell, or a sensor, to indicate the presence of rodents. The mechanism for signaling may include lights or sound devices that can be secured to the trap or remotely activated via wired or wireless means. The signaling device can be time delayed such that additional vermin can enter the trap before intervention by the operator and is also capable of monitoring several traps concurrently.

33 Claims, 10 Drawing Sheets

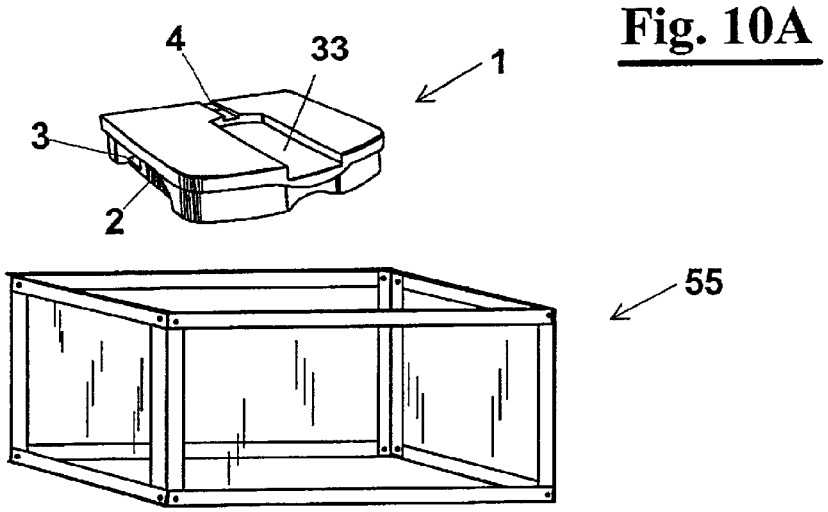
Fig. 10A
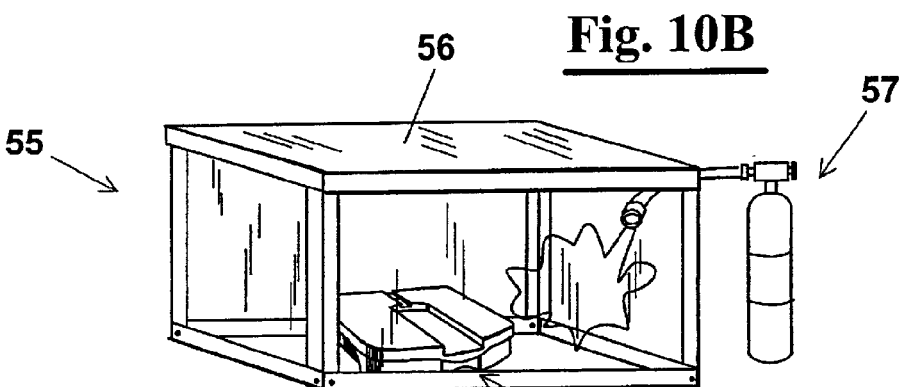
Fig. 10B
Fig. 11
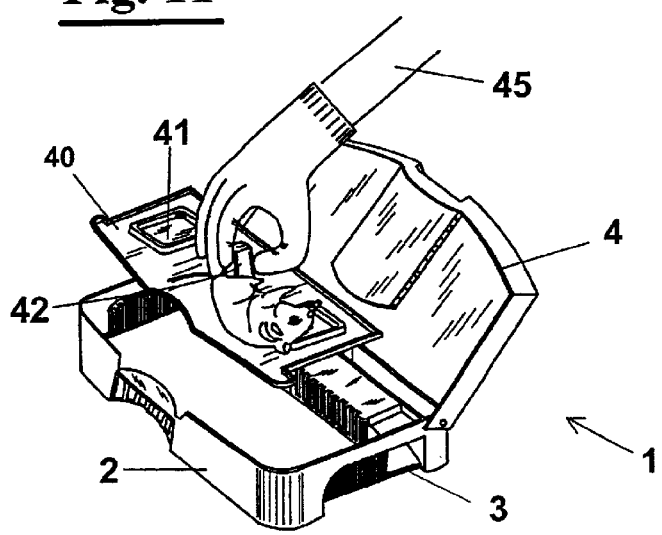

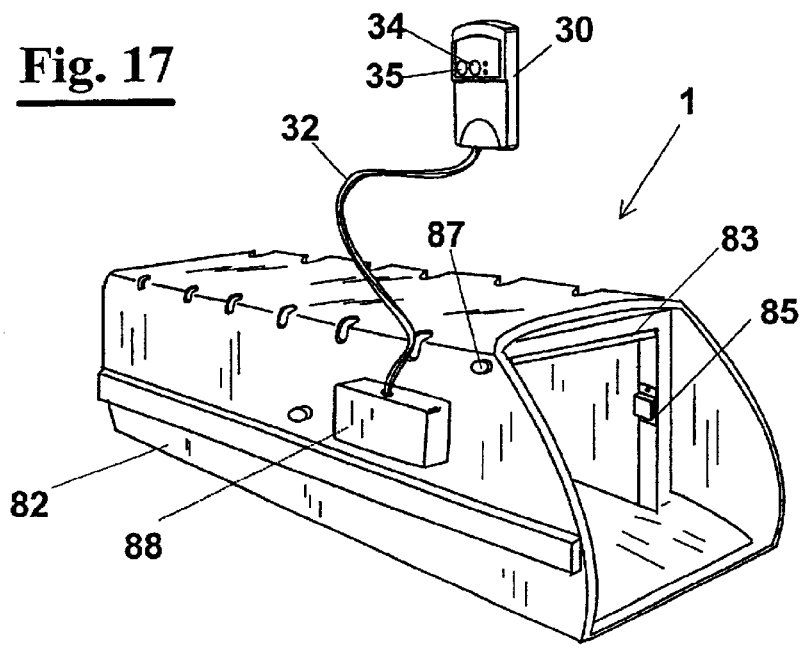
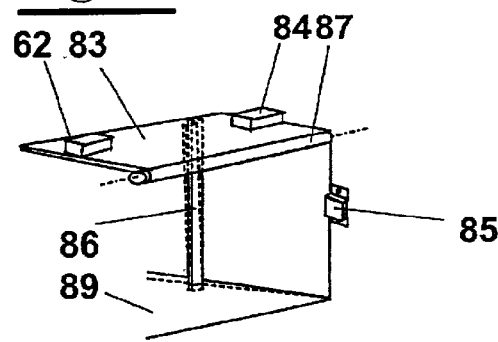
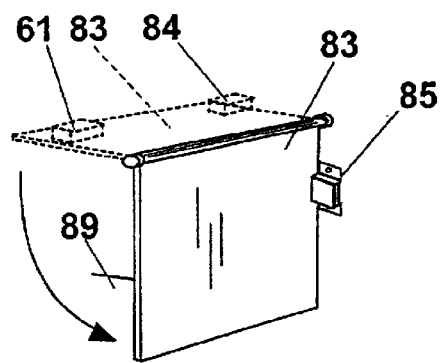

METHOD FOR SIGNALLING THE PRESENCE OF PREY IN TRAPS FOR VERMIN AND DEVICE FOR CARRYING OUT THIS METHOD

CROSS REFERENCE TO RELATED APPLICATIONS

This application is a Continuation-in-Part application of U.S. patent application Ser. No. 09/590,219, filed on Jun. 8, 2000 now abandoned, which claims benefit of Italian Patent Application No. IT PI199A000032, filed on Jun. 8, 1999.

FIELD OF THE INVENTION

The present invention relates to the field of rodent disinfesting, and more precisely, to a method for signaling the presence of prey in traps for vermin. The present invention also relates to devices for carrying out the method.

BACKGROUND OF THE INVENTION

Rodent infestation of areas frequented by humans is troublesome and can ignite particular displeasure when infestation occurs in intimate settings such as the home. However, the problems associated with rodent infestation are not limited to the home; rodent infestation can be particularly detrimental to businesses that deal with food, consumables and other consumer goods, such as supermarkets, grocery stores, delis or restaurants. In addition to these situations in which rodent infestation is significantly detrimental, rodent infestation can also be detrimental to factories, farms and other workplaces.

In fact, workplace regulations (UNI, ISO, EN) concerning safety and hygiene are often strict with respect the quality of the working environment. Additionally, the workplace and the quality of products and services provided by various businesses are often verified by certifying authorities according to international, national, state or local standards. Thus, the monetary investment required to comply, and to maintain compliance, with laws, regulations and standards can be high.

Currently, most systems for eliminating small rodents are based on baited traps. For example, current methods and devices for removing rodents comprise and typically use poisonous feeds, glues that stick to the vermin, snap reacting traps or enclosures into which rodents can enter through one way passages.

However, in food and food preparation settings, the use of poisonous substances is often unlawful because of the possibility of the poison cross-contaminating those items which humans come into contact with, or those items which are meant for human consumption.

In addition, snap operating traps are not very efficient and, generally, can only capture one animal at a time. Also, the snap mechanisms can easily be identified by mice, which eventually learn to avoid these types of traps. Furthermore, snap type traps cannot be safely used in public places.

Box shaped traps, on the other hand, have many advantages; they are safe, they are capable of capturing many vermin, and they are relatively hygienic since the vermin are substantially retained within an enclosure.

However, one problem that limits the efficacy of the box shaped trap is that fact that the traps must be frequently inspected. Inspection of each trap can be difficult since the traps are typically placed in locations that are hidden or inaccessible for inspection purposes. In cases where large areas are to be disinfested, such as stores or supermarkets, traps are often located in hidden places or distributed far away from one another such that frequent, periodic checks of the traps are expensive and troublesome. Furthermore, to check whether vermin are present in the traps, it is generally necessary to employ specialized staff to open the traps. Finally, frequent inspection and disruption of the traps can cause vermin avoidance of the traps.

Hence, for the foregoing reasons, there exists a long-felt need to provide a method for signaling and monitoring the presence of vermin in several traps without the need for causing disruption to the trap.

SUMMARY OF THE INVENTION

It is, therefore, an object of the present invention to provide a method for determining the presence of prey in traps used for capturing vermin, such as for example small rodents. The present invention provides such a method that is practical and inexpensive and allows quick monitoring of each trap, or of several traps, concurrently.

It is another object of the present invention to provide a device used for carrying out this method.

These and other objects are achieved by the present invention whose methods are generally carried out by automatically detecting the presence of the prey in traps and using light and/or acoustic and/or remote signaling that at least one prey is present. Advantageously, signaling the presence of prey can be delayed such that attraction of additional vermin continues up until an operator checks the traps directly.

The device used for carrying out this method generally comprises means for automatically signaling the presence of the prey in the traps and using light or acoustic means responsive to the detecting means to signal that at least one prey has been caught.

The signaling device of the present invention can be advantageously mounted to box-shaped traps that have inlet ports with one-way systems, such as box-shaped traps comprising tilting or rotating platforms hinged on central pins or tilting wings hinged on side pins. These types of traps are typically operated by the vermin, which enter the traps and cause rotation of the platform or wing. Movement of the platform or wing typically raises a platform or wing, which in turn, prevents the vermin from escaping. Once the prey is in the trap and the prey has passed a point within the trap, the trap automatically resets itself to the starting position.

In one embodiment of the present invention the means for detecting prey may comprise a push button activated by the lowering of at least one of the tilting elements previously described. Alternatively, the rotation of the tilting elements can be exploited to detect the entry of the vermin in the trap; in this case the detection means may comprise a switch operated by the rotation of at least one of the pins about which the wings are hinged. Other means for detection may comprise a magnet(s), located on one of the two tiltable structures and a proximity sensor. For example, an induction sensor can be mounted on a circuit board and the sensor connected to signaling means. Additionally, a counterweight could be connected to the wing to provide return to the starting position.

Further detection means may comprise the use of one, or a plurality, of stick, or string, elements that are moved by the vermin in the trap. Such elements could be arranged horizontally or vertically. In a first case, an end could be connected to the inner upper surface of the trap and the other end arranged to hang over the lower inner surface of the trap in order to be operated by the movement of the vermin therein. In a second case, an end could be connected to an inner side of the trap and the other end positioned near the center and at a height that moveable by the prey.

Finally, in another embodiment the means for detecting may comprise a photocell or a sensor arranged in the box body of the trap to detect the presence of the prey.

Advantageously the trap can be provided with means for easily removing the titling means and inlet port of the trap via snap engagement of the tilting means to fastening holes made in the body of the trap. Additionally, a tray can be arranged near the bottom of the trap which has bait receiving recesses and means for grasping the tray for easy remove the captured animals or any waste. Also, the top of the trap may comprise a protective, removable cover arranged above the trap and connected to the walls so as to prevent any damage to the trap as may occur from falling items. Preferably theft of the trap can be prevented by connection to a wall of a building near the floor, or similar structure, by means of a metal cable portion protruding from the base of the trap.

In an advantageous embodiment of the present invention, the means for signaling can comprise both light and/or sound devices arranged on the top of the trap, or on a remote support. In one embodiment, the signaling mechanism can be connected to the detection means via an electrical cable. In another embodiment, signaling can be provided by a radio or infrared signal transmitter connected to the detection means. Also, electrical cables can be provided with protective means, for example a coil spring of flexible material, for preventing animals from biting or chewing the electrical cable and damaging the signaling device.

One embodiment of the invention provides for the elimination of the captured animal by placing the trap in a box that is filled with gas. The gas fills the box and the trap through the openings of the trap body, such that the trapped animal expires.

According to another embodiment of the invention, the signaling system may be time-delayed such that the communication of the entry of prey into the trap does not cause the operator to prematurely inspect the trap prior to the entry of additional prey into the trap.

Finally, the device according to the present invention allows the monitoring of several traps at the same time by providing a signaling system that comprises a control board for displaying the presence of the prey in one or more traps.

BRIEF DESCRIPTION OF THE DRAWINGS

The present invention is more easily described by the following detailed description and by reference to the accompanying drawings in which:

FIGS. 10A and 10B show a perspective view of an elimination device for animals present in the trap;

FIG. 11 shows a perspective view of the removable tray of the trap for easy removal of the prey;

FIG. 17 shows a perspective view of an alternative embodiment of the trap according to the invention; and, FIGS. 18 and 19 show a diagrammatic view of the operation of the trap of FIG. 17.

DETAILED DESCRIPTION OF THE PREFERRED EMBODIMENT

Figure 1:
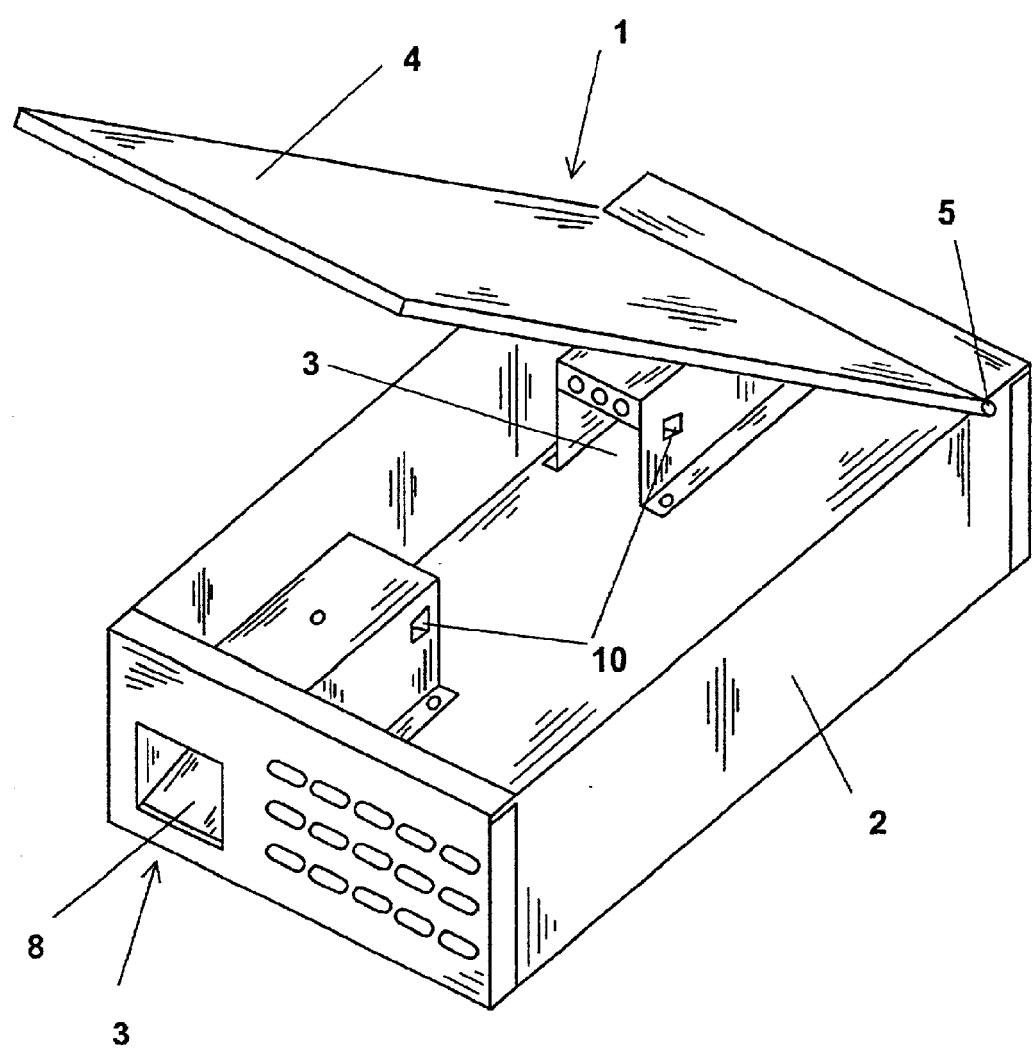
FIG. 1 shows a perspective view of one embodiment of the trap of the present invention.

With reference to FIG. 1, trap 1 according to the present invention generally comprises a box-shaped body 2, two inlet ports 3, and cover 4 hinged to the end on two pins 5, of which only one is shown.

Figure 2A:
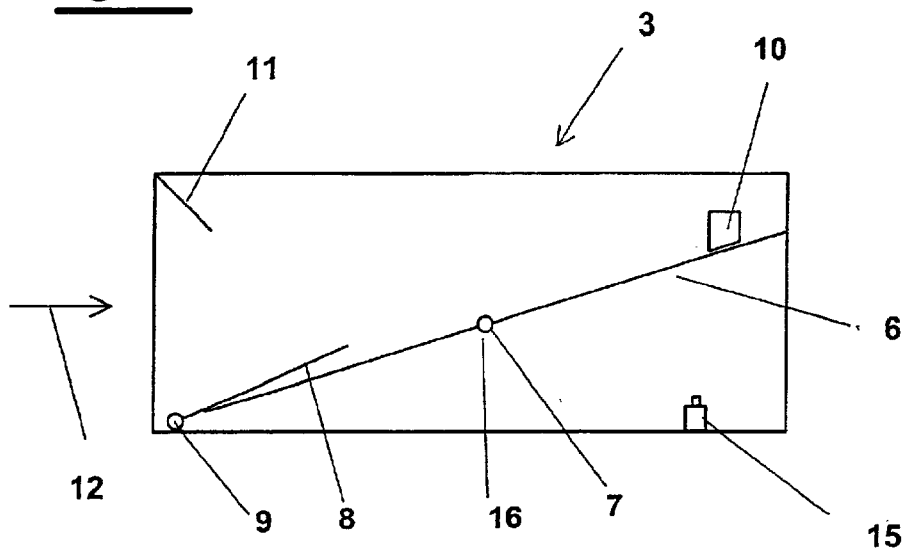
FIGS. 2A, 2B, 2C show a schematic, cross sectional view of the operation of an inlet port of a trap of the present invention as well as potential arrangement of the sensors for detection.
Figure 2B:
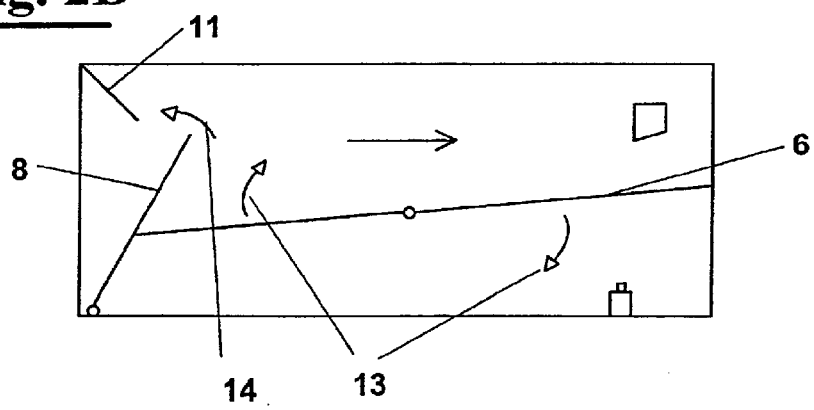
Figure 2C:
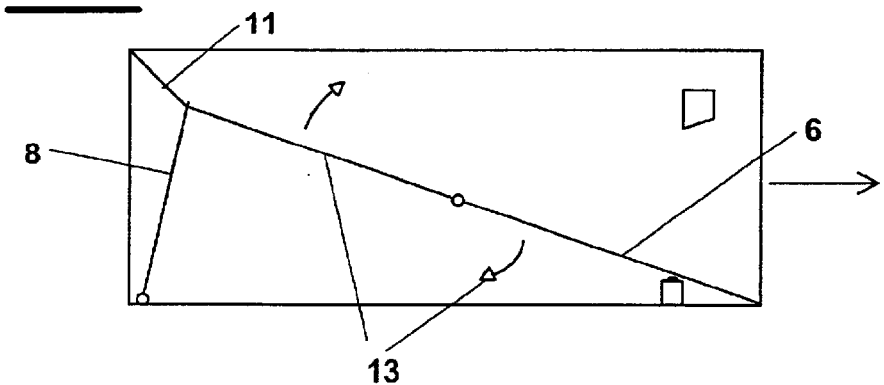

With reference now to FIGS. 2A–2C and 3, inlet port 3 is equipped with a one way mechanism comprising tilting platform 6, hinged on central pin 7; tilting wing 8, hinged on side pin 9, abutments 10 and 11, and pushbutton/switch 15. As can be seen in FIGS. 2A–2C, the operation of the inlet port 3 mechanism for trapping the prey is shown diagrammatically; an animal enters the trap according to direction 12 of FIG. 2A and passes central pin 7 to cause rotation 13 of tilting platform 6, rotation of tilting platform 6 causes tilting wing 8 to raise in direction according to arrow 14 and to touch abutment 11. After the prey has passed the inlet port, the weight of the wing causes tilting platform 6 to rotate as shown in FIG. 2C, which returns the trap back to the starting position.

Figure 3:
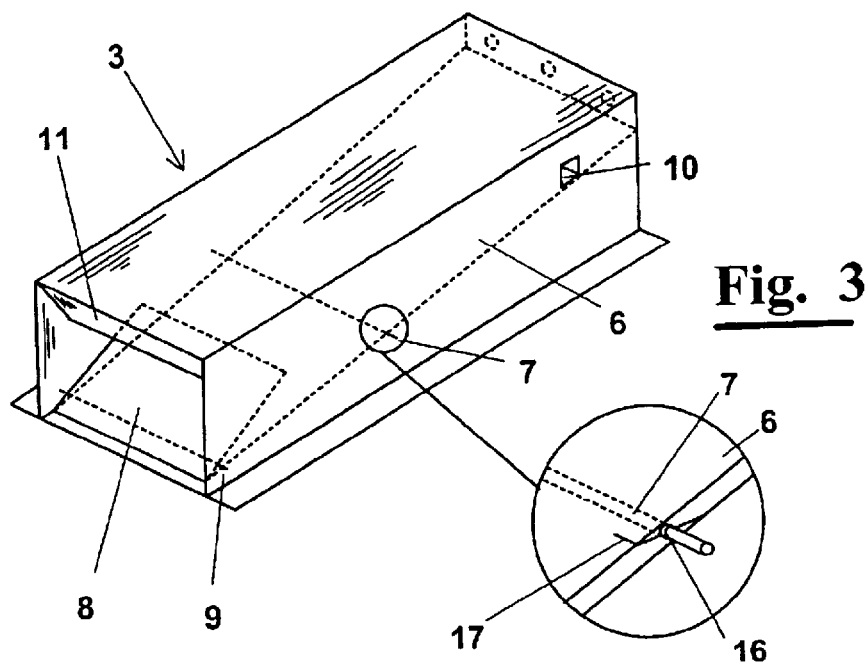
FIG. 3 shows an elevational perspective side view of an inlet port of the trap of FIG. 1 as well as possible arrangement of the sensors for detection.
Figure 4A:
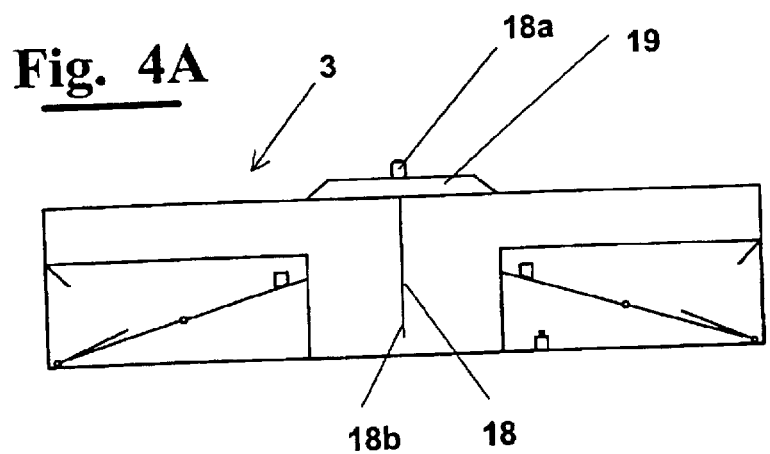
FIG. 4A is an illustration of a schematic, cross sectional view of a trap of the present invention comprising a vertically oriented sensor for sensing prey.
Figure 4B:
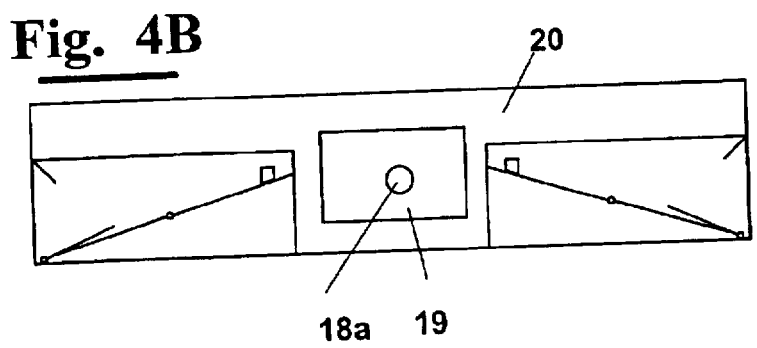
FIG. 4B is an illustration of a schematic, cross sectional view of a trap of the present invention comprising a horizontally oriented sensor for sensing prey.

According to the preferred embodiment, a pushbutton/switch 15, is caused to operate as a result of the lowering of tilting platform 6. However, it should be appreciated by those having skill in the art that various embodiments for detecting the entry of vermin into the trap can be employed and the present invention is not limited to tilting platform means, tilting wing means, electronic switches, pushbuttons, sensors and other non-electronic pushbutton and other lever means. For example, as shown in FIG. 2, another means for detection comprises switch 16, which is operated by the rotation of pin 7, however, detection means may be operated by means of tilting wing 8 and corresponding pin 9. As can be seen in FIG. 3, switch 16 may be mounted by means of two strips 17 that move relative to the tilting wing and tilting platform. With reference now to FIGS. 4A and 4B, another embodiment of the detection means comprises the use of one, or a plurality, of elongated elements 18, which are operated by the movement of the vermin in the trap. Elements 18 can be arranged either vertically, as in the case in FIG. 4A, or horizontally, as in FIG. 4B. In the case of vertical elongation (FIG. 4A), end 18*a* is connected to the detection device 19 located on the cover of the trap and end 18*b* is arranged to hang above the bottom surface of the trap such that the movement of the vermin acts upon the element. In the case of horizontal elongation (FIG. 4B), element 18 is positioned such that end 18*a* is connected detection device 19 on side 20 and end 18*b* (not shown) is connected to the opposite side of the trap such that the element is centrally positioned and at a height capable of being engaged by the moving prey. It should be appreciated by those skilled in the art that other methods of detection can be employed which do not depart from the spirit and scope of the present invention; for example one may consider the use of photocells or sensors to indicate the of presence of prey.

Figure 5A:
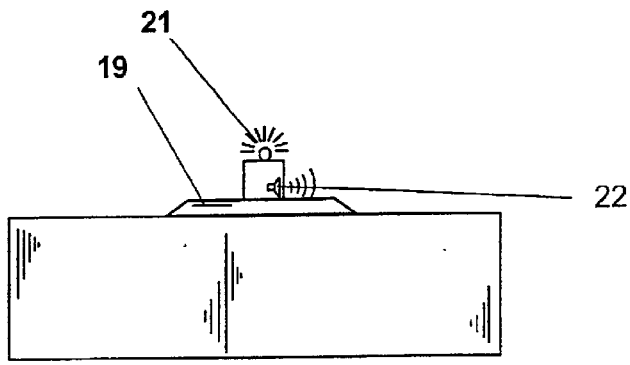
FIGS. 5A, 5B, 5C show schematic views of possible links between the detection and signaling means of the present invention.
Figure 5B:
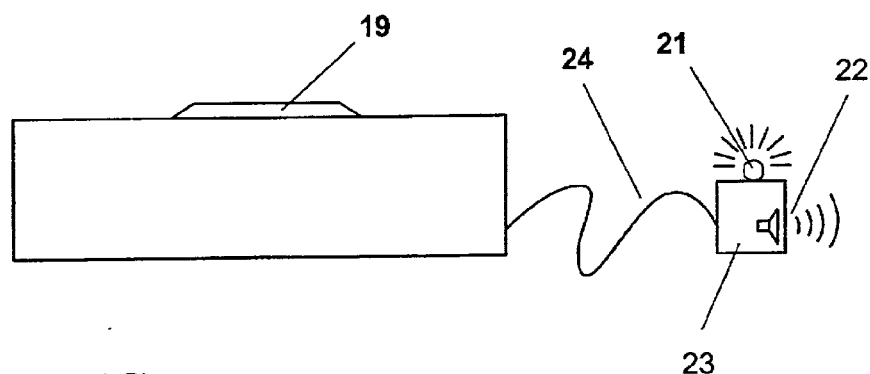
Figure 5C:
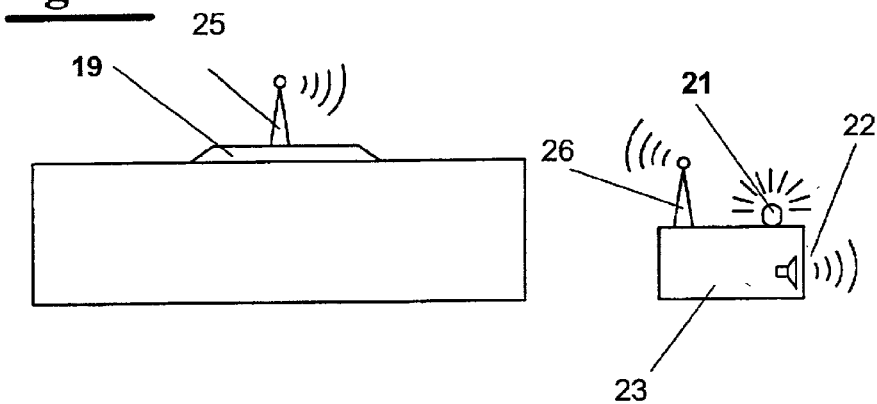

The means for signaling the presence of prey can comprise both audible and/or visual stimuli. For example, FIGS. 5A–5C disclose light device 21 and sound device 22, arranged either on the trap (FIG. 5A) or on a remote support 23 (FIGS. 5B–5C). In the case of a remote device, connection to the system of detection can be carried out by means of electric cable 24, and/or by means of receivers of radio or infrared signals. As can be seen in FIG. 5C, which shows wireless communication means, detection of the presence of prey is transmitted from signal transmitter 25 and received by receiver 26, which is connected to the signaling devices 21, 22.

Figure 6A:
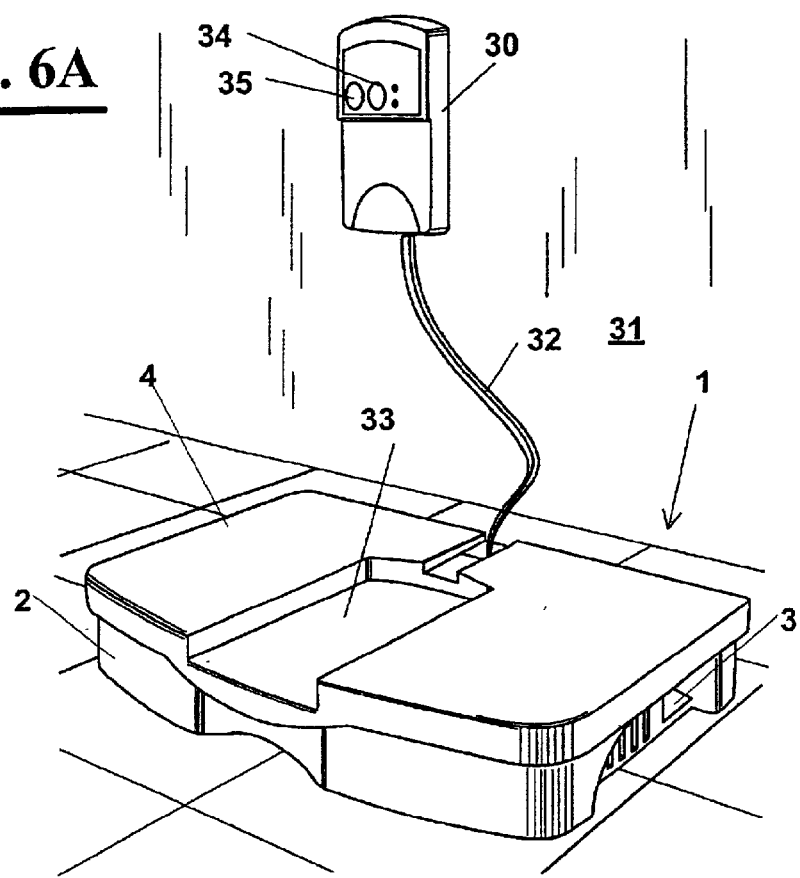
FIGS. 6A and 6B shows an embodiment of the present invention comprising means for signaling which are operatively arranged for attachment and removal from the trap housing.
Figure 6B:
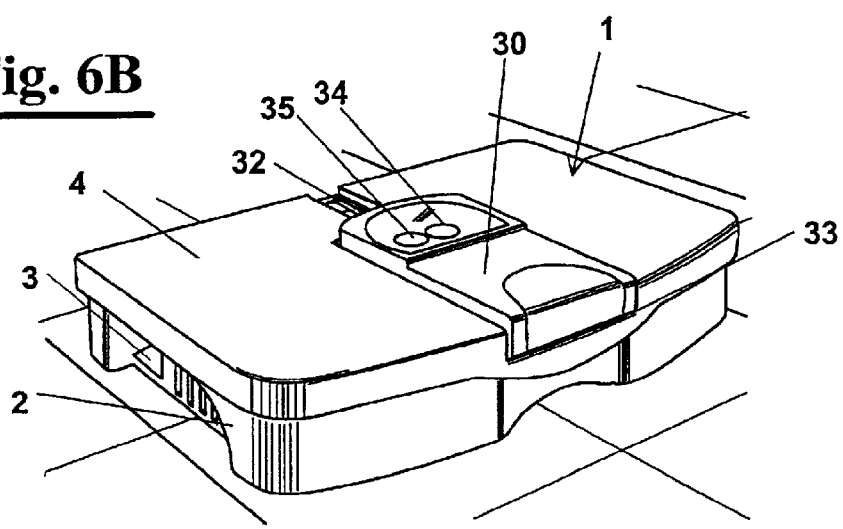

It should be appreciated, however, by those having ordinary skill in the art that other means for signaling the presence of prey are contemplated by the present invention. For instance, an operator may configure the signaling systems to communicate the entry of prey into the trap after a preset time delay such that other vermin may enter the trap before intervention. In addition, the present invention contemplates monitoring several traps at the same time via an electronic control board that displays the presence of prey in one, or a plurality of traps. Advantageously, the signaling means are integrated within sealed housings of the trap so that they are not damaged during use, such as washing or disinfecting the trap. In addition, the signaling means are compact and easily removed, to make washing and disinfecting the trap easy and efficient. Finally, as can be seen in FIG. 6A, signaling unit 30 is shown as being fixed to a wall 31. Cable 32 connects the signaling unit 30 to the trap 1 wherein the detection switch is located. Cover 4 advantageously comprises a recess 33 in which the signaling unit may be accommodated (FIG. 6B) for transporting the trap or for compactly using the trap with the signaling unit 30 attached. Hence, when the trap is used in a hidden place, e.g. under a piece of furniture, the signaling unit 30 is arranged according to FIG. 6A, whereas when the trap is used in a open space, signaling unit 30 is accommodated in recess 33 according to FIG. 6B. Additionally, it should be appreciated that signaling unit 30 may comprise a keyboard for electronically programming the various functions of the trap of the present invention. For example, the length of time delay or the signaling means to be utilized upon detection of a prey. The latter may comprise integrated sound and light means 34 and 35, or an electronic display, as well as a transmitter for sending the signal of presence of vermin in the trap to a remote console.

Figure 7A:
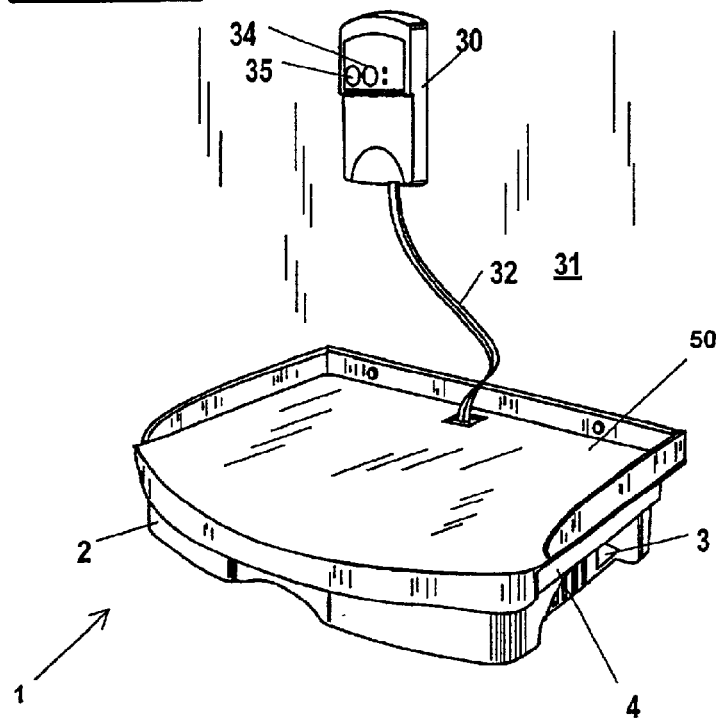
FIG. 7A shows a perspective view of the trap of FIGS. 6A and 6B with a cover for preventing damage.
Figure 7B:
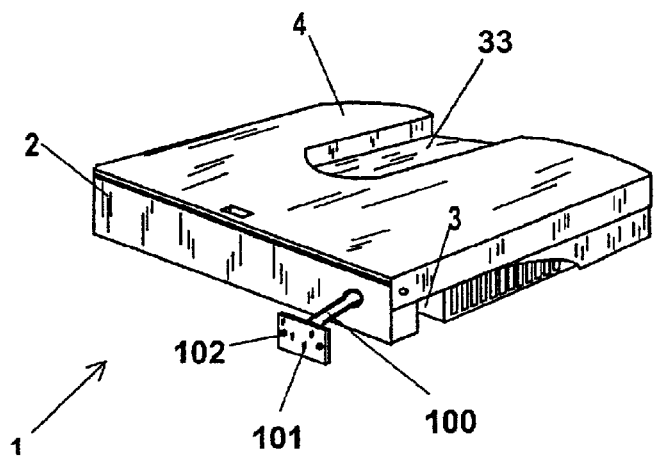
FIG. 7B shows a rear perspective view of the trap of FIGS. 6A and 6B comprising an anti-theft cable.

The present invention also contemplates several protective and security features. Referring now to FIG. 7A, trap 1 may comprise protective cover 50, for protecting it from damage that may occur in from common usage or when placed in rough settings, such as factories. As can be seen in FIG. 7B, a cable 100 is provided to act as an antitheft means. Generally, cable anti-theft means comprises a metal cable portion protruding from trap 1, which can be fastened to a wall by it means of a fastening plate 101 having holes 102.

Figure 8:
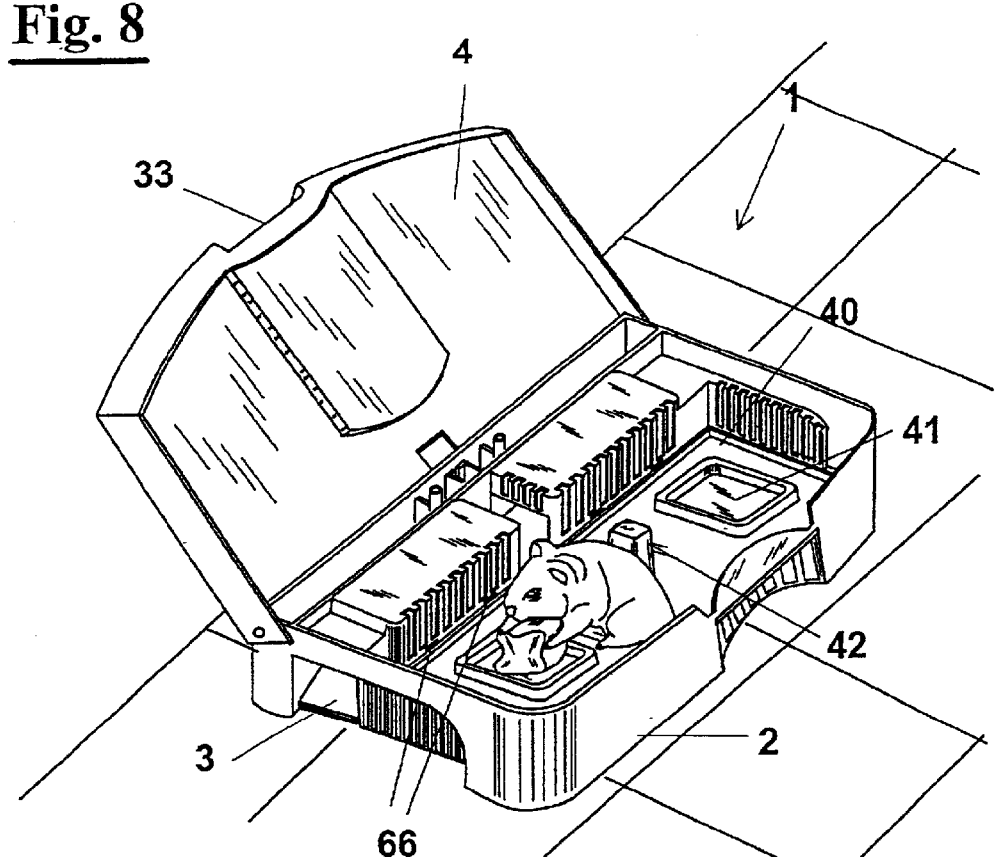
FIG. 8 shows a perspective view a trap of the present invention with the cover open.
Figure 9:
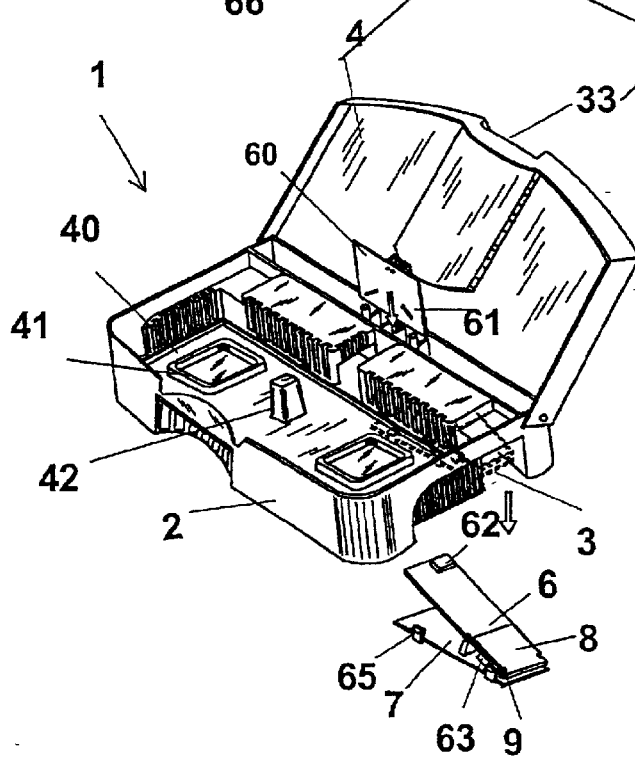
FIG. 9 shows a perspective view of the trap comprising an electwnic circuit board and proximity sensors and tiltable plates that are easily unfastened.
Figure 12:
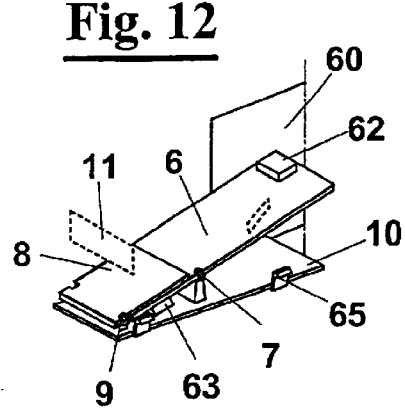
FIGS. 12–15 show various embodiments of the tiltable means of the present invention as well as various signaling means.
Figure 13:
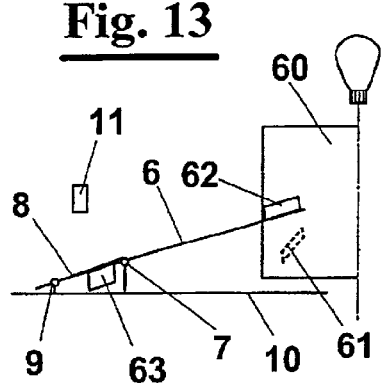
Figure 14:
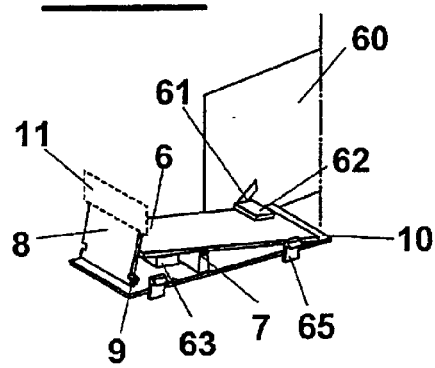
Figure 15:
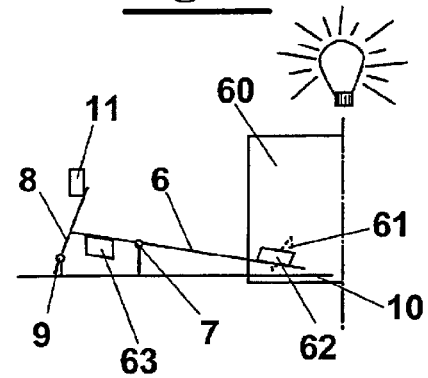

Disposal of prey is easily accommodated by the present invention. With reference to FIG. 8, at base 2 of the trap there is provided tray 40 having bait receiving recesses 41 and a pull handle 42 for easily removing a captured animal, or for easily cleaning the trap. The tray may comprise disposable types, or may be washed and used again. The disposal of rodents, by operator 45, according to the present invention is, for safety purposes, preferably carried out after the animal has expired. Expiration of the rodent can be accelerated (see FIGS. 10A and 10B) by placing the trap 1 into a box 55 provided with a cover 56 and introducing gas 57, for example $CO_2$, into the box. The gas fills the box and penetrates the trap through the openings of body. The $CO_2$ concentration increases in box 55 until a lethal value for the animal is achieved.

An alternative embodiment of the present invention is shown in FIGS. 12–15. This mechanism comprises removable inlet port and wing means having snap means 65 on support 10 operatively arranged for snap fit with holes 66 (see FIG. 8) of body 2 such that support 10 can be easily removed for disposal of prey, or cleaning of the trap. Additionally, FIGS. 9 and 12–15 show magnetic means for signaling the presence of prey. On the upper surface of tilting wing 6 is magnet 62, which is operatively arranged for communication with proximity sensor 61 mounted on electronic circuit board 60. It should be appreciated that sensor 61 may be remotely connected to board 60 via wire leads. As can be seen by the figures, when the tilting wing is rotated about hinge 7, as may occur from the presence of prey, magnet 62 is forced to a position near sensor 61, which is connected to means for electronic signaling 30. The subsequent return of the wing to the starting position, after a prey has passed, is provided by counterweight 63 attached to the lower surface of tilting wing 6. It should be appreciated by those having ordinary skill in the art that the position of the magnet, sensor and signaling methods are solely for purposes of illustration and other positioning and methods of detection and signaling are contemplated by the present invention.

Figure 16:
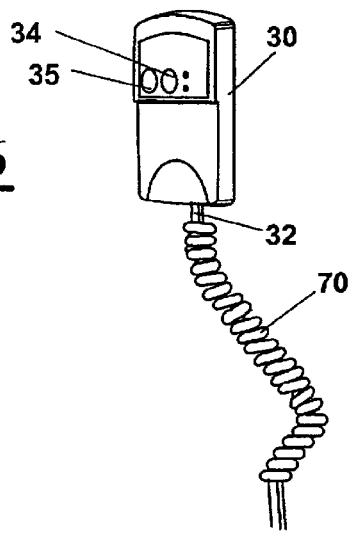
FIG. 16 shows a perspective view of a protection coil for an electrical cable of the trap according to the invention.

Finally, other embodiments of the present invention can be viewed by reference to FIGS. 16–19. FIG. 16 shows coil 70 provided for protecting electrical cable 32 against biting, gnawing and/or chewing. FIGS. 17–19 show an embodiment wherein trap 82 is provided with a pivotable door 83 operatively arranged near the inlet, which is capable of rotating about hinge 87. In a baited position, the pivotable door maintains an open position via support 86, which extends from tiltable floor 89. When prey walks on central part of tiltable floor 89, support 86 is caused to slightly rotate, leaving door 83 free to rotate and close under the force of gravity. Magnetic elements 84 and 85 are provided for keeping door 83 closed in order to prevent the prey from escaping. Door 83 is also provided with magnet 62 for communicating with a sensor (not shown) present on or in housing 88. The configuration of magnet and sensor for communicating and signaling the presence of prey is intended to be similar to that of FIGS. 13–17, as are the means for signaling 30.

Thus, it is seen that the objects of the present invention are efficiently obtained, although it should be readily apparent to those having ordinary skill in the art that changes and modifications can be made to the invention without departing from the spirit and scope of the invention as claimed.

What is claimed is:

1. A method for determining the presence of prey in one or more traps having at least one inlet port comprising ramp means, said ramp means comprising tilting platform means, said tilting platform means allowing the prey to enter said trap and prevent the prey from escaping said trap, said method comprising:

detecting the presence of the prey in said one or more traps having at least one inlet port by a detection means;

communicating the detection of the prey to a signaling means; and, signaling the detection of the prey.

2. The method of claim 1 wherein said signaling comprises audible stimuli.

3. The method of claim 1 wherein said signaling comprises visual stimuli.

4. The method of claim 3 wherein said stimuli comprises light.

5. The method of claim 1 wherein said signaling is time delayed according to predetermined criteria.

6. A device for determining the presence of prey in one or more traps having at least one inlet port comprising ramp means, said ramp means comprising tilting platform means allowing the prey to enter said trap and prevent the prey from escaping said trap, said device comprising:

means for detecting of the presence of prey in said one or more traps having at least one inlet port;

means for communicating the detection of said prey to a signaling means; and, means for signaling the presence of the prey.

7. The device of claim 6 wherein said means for signaling comprises audible stimuli.

8. The device of claim 6 wherein said means for signaling comprises visual stimuli.

9. The device of claim 8 wherein said visual stimuli comprises light.

10. The device of claim 6 wherein said signaling means are electronic.

11. The device of claim 6 wherein said signaling means is time delayed according to predetermined criteria.

12. The device of claim 6 wherein said detection means comprises elongated elements extending towards the center of the trap and operated by the movement of the prey in said trap.

13. The device of claim 6, wherein said detection means comprises a photocell.

14. The device of claim 6 wherein said detection means comprises an electronic sensor operatively arranged within the body of the trap.

15. The device of claim 6 wherein said means for communicating comprises a wire cable.

16. The device of claim 6 wherein said means for communicating comprises a wireless transmitter and receiver.

17. The device of claim 6 comprising a remote control board responsive to the presence of prey in at least one trap.

18. A device for determining the presence of prey in one or more traps having at least one inlet port equipped with means to prevent the prey from escaping, said device comprising:

means for detecting of the presence of prey in said one or more traps having at least one inlet port; said inlet port having a tilting platform on a central pin and operatively arranged to be actuated by prey that enter said trap and a tilting wing hinged on a side pin operatively arranged for actuation by said tilting platform such that the escape of the prey from the trap is prevented;

means for communicating the detection of said prey to a signaling means; and, means for signaling the presence of the prey.

19. The device of claim 18, wherein said detection means comprises a switch operatively arranged to be engaged by said tilting platform.

20. The device of claim 18, wherein said detection means comprises a switch operatively arranged to be engaged by said tilting wing.

21. The device of claim 19 wherein said switch is an electronic device.

22. The device of claim 20 wherein said switch is an electronic device.

23. The device of claim 18 wherein said detection means comprises a magnet secured to one of said tilting devices and an electronic sensor secured to said trap, said magnet and sensor operatively arranged to transmit an electronic signal to said signaling means when said magnet is proximate said sensor.

24. The device of claim 18 wherein said means for signaling comprises a satellite device operatively arranged for detachment from said trap.

25. The device of claim 24 wherein said satellite device is connected to trap by means of a signal transmission cable.

26. The device of claim 25 wherein said signal transmission cable comprises a protective coil.

27. The device of claim 24 wherein said satellite device comprises wireless means for providing transmission of signals.

28. The device of claim 18 wherein said inlet device comprises a tilting plate and a counterweight operatively arranged for automatically returning said trap to the starting position after activation.

29. The device of claim 18 wherein said tilting plate is operatively arranged for snap engagement to said trap.

30. The device of claim 18 wherein said trap comprises a bottom surface, said bottom surface comprising a tray having bait receiving recesses and means for grasping the tray.

31. The device according to claim 18 comprising a protective cover for preventing damage to said trap.

32. The device of claim 18 comprising an antitheft device having a cable connected to the trap and operatively arranged for attachment to a relatively static body.

33. The device of claim 18, wherein said means for preventing escape of prey comprises a pivotable door proximate said inlet, said door being capable of rotation between a closed and an open position upon movement of said prey, and means for electronic detection of said prey comprising magnetic elements on said door, said magnetic elements operatively arranged for communication with a proximity sensor connected to a signaling means.

* * * * *